(12) United States Patent
Kruger et al.

(10) Patent No.: US 6,592,927 B1
(45) Date of Patent: Jul. 15, 2003

(54) SKIMMED MILK POWDER SUBSTITUTE

(75) Inventors: Christof Friedrich Karl Kruger, Hamburg (DE); Hans-Ulrich Cordts, Eisendorf (DE); Richard James Laverty, Hamburg (DE); Fernando Pipa, Tangstedt (DE)

(73) Assignees: Xyrofin Oy, Espoo (FI); NZMP (Germany) GmbH, Rellinger (DE)

( * ) Notice: Subject to any disclaimer, the term of this patent is extended or adjusted under 35 U.S.C. 154(b) by 0 days.

(21) Appl. No.: 09/601,607

(22) PCT Filed: Feb. 3, 1999

(86) PCT No.: PCT/EP99/00700

§ 371 (c)(1),
(2), (4) Date: Sep. 20, 2000

(87) PCT Pub. No.: WO99/39585

PCT Pub. Date: Aug. 12, 1999

(30) Foreign Application Priority Data

Feb. 3, 1998 (EP) .............................. 98101821

(51) Int. Cl.$^7$ .............................. A23G 1/00; A23C 9/15
(52) U.S. Cl. ...................................... 426/588; 426/631
(58) Field of Search ........................ 426/588, 548, 426/631, 660, 593

(56) References Cited

U.S. PATENT DOCUMENTS

| | | | | |
|---|---|---|---|---|
| 2,853,586 A | * | 5/1958 | Peebles | |
| 2,964,407 A | * | 12/1960 | Sinnamon | |
| 4,011,349 A | * | 3/1977 | Riesen | |
| 4,248,895 A | * | 2/1981 | Stroz et al. | |
| 4,529,611 A | * | 7/1985 | Uiterwaal | 426/34 |
| 4,532,146 A | * | 7/1985 | Durand | 426/580 |
| 4,675,200 A | * | 6/1987 | Serpelloni | 426/567 |
| 4,876,106 A | * | 10/1989 | Sabatura | 426/583 |
| 4,980,189 A | * | 12/1990 | Keme | 426/548 |
| 5,098,730 A | * | 3/1992 | Pepper | 426/548 |
| 5,128,156 A | * | 7/1992 | McKenna et al. | 426/42 |
| 5,238,698 A | * | 8/1993 | Zumbe | |
| 5,264,228 A | * | 11/1993 | Pray | |
| 5,266,348 A | * | 11/1993 | Zumbe | 426/660 |
| 5,360,621 A | * | 11/1994 | Mentink | 426/548 |
| 5,362,498 A | * | 11/1994 | Aiache | 424/435 |
| 5,397,589 A | * | 3/1995 | Korte et al. | 426/580 |
| 5,490,996 A | * | 2/1996 | Despland | 426/548 |
| 5,501,865 A | * | 3/1996 | Zumbe | 426/548 |
| 5,580,601 A | * | 12/1996 | Ribadeau-Dumas | 426/660 |
| 5,629,040 A | * | 5/1997 | Takemori | 426/548 |
| 5,711,982 A | * | 1/1998 | Takemori | |
| 5,756,687 A | * | 5/1998 | Denman et al. | 435/183 |
| 5,766,330 A | * | 6/1998 | Knights et al. | 106/124.2 |
| 5,811,148 A | * | 9/1998 | Chiu et al. | 426/548 |
| 5,902,630 A | * | 5/1999 | Imai et al. | 426/583 |
| 5,962,063 A | * | 10/1999 | Siukola | 426/631 |
| 6,045,850 A | * | 4/2000 | Kondou | 426/548 |
| 6,119,509 A | * | 9/2000 | Pakes et al. | 426/588 |
| 6,139,901 A | * | 10/2000 | Blazey et al. | 426/580 |
| 6,261,627 B1 | * | 7/2001 | Armstrong et al. | 426/584 |

FOREIGN PATENT DOCUMENTS

| | | | |
|---|---|---|---|
| DE | 2354475 | * | 11/1972 |
| DE | 23 54 475 | | 10/1973 |
| EP | 0026119 | * | 9/1979 |
| EP | 0203706 | * | 4/1986 |
| EP | 0 203 706 | | 12/1986 |
| EP | 0317917 | * | 11/1988 |
| EP | 0788744 | * | 1/1996 |
| EP | 0 788 744 | | 8/1997 |
| FR | 2559034 | * | 2/1984 |
| FR | 2 559 034 | | 8/1985 |
| GB | 1430639 | * | 5/1973 |
| GB | 1430639 | | 3/1976 |
| JP | 09037714 | * | 2/1997 |
| US | 0477832 | * | 1/1992 |
| WO | WO93/02566 | * | 2/1993 |

OTHER PUBLICATIONS

Patel 1991 Manufacture of Low Lactose Powder Using Ultrafiltration Technology Lebensm–Wiss u Technol 24: 338–340.*

Patent Abstracts of Japan No. 09037714.

Patel et al., Lebensm–Wiss. u Technol, 24 338–3401(1991).

* cited by examiner

*Primary Examiner*—Carolyn Paden
(74) *Attorney, Agent, or Firm*—Scully, Scott, Murphy & Presser

(57) ABSTRACT

Provided is a skimmed milk powder substitute which comprises an intimate mixture of protein and a non-fermentable sweetening and/or bulking agent. The powder includes 0–40 weight parts of lactose and 0–10 weight parts of fat per 100 weight parts of protein. The powder is prepared by forming an aqueous solution or dispersion of the components including protein and the sweetening/bulking agent followed by drying, e.g. by spray drying. The skimmed milk powder substitute is useful as an ingredient in the manufacture of food, in particular chocolate.

13 Claims, No Drawings

SKIMMED MILK POWDER SUBSTITUTE

BACKGROUND OF THE INVENTION

1. Field of the Invention

The present invention relates to a skimmed milk powder substitute, and more particularly to a skimmed milk powder substitute useful in the manufacture of foods having a reduced content of fermentable sugars, such as confectionary, particularly chocolate.

2. Discussion of the Prior Art

There is increasing awareness in today's society that consumption of sugar-rich foods, whilst providing a good deal of pleasure, is unfortunately not conducive to good health. Such-foods have been shown to be a principal cause of tooth decay due to the fermentation of the sugars to acids within the mouth by endogenous bacteria. Additionally, excessive consumption of such foods results in obesity.

Whilst the simplest solution to this problem would be for consumers to abstain from or restrict their consumption of such sugar-rich foods, this solution has unsurprisingly not found mass appeal. Accordingly, food manufacturers are constantly investigating ways to reduce the sugar content of their foods in order to promote them as healthier alternatives to the corresponding sugar-rich products. For instance, the production of various confectionary products containing reduced sucrose contents is described in U.S. Pat. No. 4,532,146, WO 93/02566, EP-A-0 026 119 and EP-A-0 317 917.

Unfortunately, minimising or eliminating the sucrose content from a food does not provide a complete solution to the problem in the case of foods which contain other sorts of fermentable sugars such as lactose. This is particularly so for foods, such as chocolate, whose ingredients include milk derived products such as dried milk powder. Chocolate normally contains about 6%. by weight of lactose due to its content of milk derived products.

It is therefore desirable to reduce or eliminate lactose, as well as sucrose, from foods. In the case of chocolate, it is suggested in EP-A-0 317 917 and U.S. Pat. No. 5,490,996 to replace the dried milk powder conventionally included amongst its ingredients with a protein extract derived from milk. Unfortunately, the resulting chocolate does not possess the desirable milky flavour associated with good quality chocolate. It is likely that this is due to the protein extract lacking minerals which are naturally present in milk. An additional problem with the chocolates produced by the methods described in EP-A-0 317 917 and U.S. Pat. No. 5,490,996 is that they possess an unpleasant gritty mouth-feel due to the presence of relatively coarse particles within the chocolate which are not broken down during production. It is speculated that these particles result from protein chains present in the protein extract being insufficiently degraded during refining.

EP-A-0 788 744 provides a process for preparing a milk powder substitute having a reduced content of lactose. The powder is produced by homogenising milk fats and milk proteins in a weight ratio of 1:0.33–3.0 to form a stable oil-in-water emulsion in which the fat is conjugated to the protein. This emulsion is then dried to produce the milk powder.

The resulting milk powder has however a number of significant technical disadvantages. Firstly, the powder tends to agglomerate into clumps due to its relatively high fat content which leads to difficulties in bulk handling. For instance if the powder is stored in bags, then it can stiffen into a relatively hard block.

The relatively high fat content restricts the shelf life of the milk powder to around 6–9 months due to oxidation or enzymatic breakdown of the fat component which both produce unpalatable rancid flavours. Enzymatic breakdown is caused by the action of the enzyme lipase. This enzyme is naturally present in milk and is expressed by some bacterial species found in milk. The fat content can also melt at temperatures above 25° C. These problems also dictate that the milk powder substitute taught by EP-A-0 788 744 has to be transported under carefully controlled conditions.

In view of these problems, the need remains to provide a milk powder substitute free from these disadvantages and which can be used as a food ingredient, particularly of chocolate, and from which foods can be manufactured having desirable taste characteristics but reduced contents of fermentable sweeteners and fat.

SUMMARY OF THE INVENTION

Accordingly, an object of the present invention is to provide a skimmed milk powder substitute, together with a method for its preparation, which has a reduced content of lactose and fat and which can be used as an ingredient in the manufacture of foods such as chocolate.

The present invention also aims to provide foods, such as chocolate, produced using such a skimmed milk powder substitute as an ingredient.

DETAILED DESCRIPTION OF PREFERRED EMBODIMENTS

According to a first aspect, the present invention provides a method for preparing a skimmed milk powder substitute comprising the steps of:

(i) mixing:
  (a) protein selected from total milk protein, milk protein concentrate and milk protein isolate, (b) a non-fermentable sweetening and/or bulking agent, and (e) one or more salts in water to form an aqueous solution or dispersion which includes 0–40 weight parts of lactose and 0–10 weight parts of fat per 100 weight parts of the protein; and (ii) drying the solution or dispersion to form the powder substitute in which the protein and sweetening and/or bulking agent are intimately mixed.

According to a second aspect, the present invention provides a skimmed milk powder substitute comprising an intimate mixture of:

(a) total milk protein, milk protein concentrate or milk protein isolate, (b) a non-fermentable sweetening and/or bulking agent, (c) 0–40 parts by weight of lactose per 100 parts by weight of the protein, (d) 0–10 parts by weight of fat per 100 parts by weight of the protein, and (e) one or more salts.

In these aspects, the protein is a mixture of proteins from milk or skimmed milk. Such proteins may be obtained by precipitation and further purification e.g. washing, solubilisation or conversion followed by drying. It is also possible to prepare the protein by filtration, fractionation or any other process known for concentrating or isolating milk proteins. Such processes include microfiltration, ultrafiltration, ion-exchange/adsorption, manofiltration and electrophoresis.

The milk proteins are TMP (total milk protein), MPC (milk protein concentrate) or MPI (milk protein isolate). Each of TMP, MPC and MPI contain casein and whey proteins in approximately the same ratio as found naturally in milk. It is mentioned that conventional skimmed milk powder contains around 36% by weight of protein of which approximately 80% by weight are casein proteins and 20% by weight are whey proteins. The use of TMP, MPC or MPI as the source of protein results in the skimmed milk powder substitute of the present invention having a similar chemical make-up to conventional skimmed milk powder except for the replacement of the majority of lactose by a non-fermentable sweetening/bulking agent.

The protein component derived from milk may be adulterated with other milk components such as salts, fat and lactose. Whilst the presence of small amounts of fat and/or lactose are difficult to avoid, these amounts must not be so great that the resulting skimmed milk powder substitute contains more than 40 weight parts of lactose or more than 10 weight parts of fat per 100 weight parts of protein. It is in fact preferred that no fat or lactose is purposefully included in the skimmed milk powder substitute. However, it is possible that the skimmed milk powder substitute will contain limited amounts of fat and lactose by virtue of them adulterating one or more of the components used to produce the skimmed milk powder substitute such as the protein or the salt components.

The non-fermentable sweetening/bulking agent constituting the component (b) is one which does not cause a significant drop in the pH value of the dental plaque after consumption. Many such agents are known including sorbitol, mannitol, xylitol, maltitol, lactitol, isomalt, indigestible dextrin, palatinose polydextrose, leucritol, erythritol, leucrose, xylose, isomaltulose, inulin, oligofructroside and L-sugars. Preferably the sweetening agent is lactitol. If a bulking agent is mainly used as the component (b) or the sweetening agent has insufficient sweetening power, then one or more additional intense sweeteners may be included in the mixture such as acesulphame K, aspartame, cyclamate, saccharin, thaumatin, alitame, stevioside, sucralose or neohesperidin dihydrochloride (NHDL).

The protein, sweetening/bulking agent and salts are mixed together in water to form an aqueous solution or dispersion. This may be done at ambient temperature or with the application of gentle heating up to 70° C. It is preferred that an excess of water is not used as this decreases the efficiency of the subsequent drying step. Thus, it is preferred that the weight ratio of water to the total weight of the components (a) and (b) lies in the range 100:1–100, more preferably 100:40–60. If the proportion of the non-aqueous components is too high, then the resulting solution may be too viscous to allow it to be dried by the preferred technique of spray drying. On the other hand, if the proportion of the non-aqueous components is too low, then drying of the resulting solution is inefficient as substantial quantities of water have to be removed.

The aqueous solution or dispersion formed by mixing the components (a) and (b) includes 40 weight parts of lactose or less based upon 100 weight parts of the protein (a). Commercially available skimmed milk powders contain about 130 weight parts of lactose based upon 100 weight parts of protein. It will therefore be appreciated that the skimmed milk powder substitute of the present invention has a much lower relative amount of lactose than conventional skimmed milk powder. This in turn reduces the lactose content in foods in which the powder is used as an ingredient.

The components (a) and (b) are mixed in water preferably so that the aqueous solution or dispersion comprises 1 part by weight of (a) and 0.06–16 parts by weight of (b); more preferably 1 part by weight of (a) and 0.3–5 parts by weight of (b); and most preferably 1 part by weight of (a) and 0.75–1.5 parts by weight of (b). As previously mentioned, the solution or dispersion should contain no more than 0.1 weight parts of fat based on 1 part by weight of (a). Preferably the amount of fat should be 0–0.05 parts by weight and most preferably 0–0.03 parts by weight based upon 1 part by weight of (a).

The aqueous solution or dispersion may comprise further components which are ingredients of the final food such as salts in the case of confectionery such as toffees and caramels, and cocoa liquor and/or salts in the case of chocolate. By salt is meant one or more compounds or components having a salt-like taste such as that possessed by e.g. sodium chloride or potassium chloride. The type and amount of salts are chosen preferably so that the resulting skimmed milk powder substitute has the same degree of salt taste as conventional skimmed milk powder. Skimmed milk powder contains, by weight, about 1.3% calcium, 1.6% potassium, 0.1% magnesium, 0.5% sodium, 1.0% phosphorus (as phosphate) and 1.0% chloride.

The salts are included in the aqueous solution or dispersion in an amount of 1–400, preferably 5–80, and more preferably 10–35 parts by weight based upon 100 parts by weight of protein present in the solution or dispersion. It is preferred that the salts should contain one or more of the ionic species $Na^+$, $K^+$, $Ca^{++}$, $Mg^{++}$, $Cl^-$, $SO_4^-$ and $PO_4^{3-}$.

Ordinary milk includes around 0.7% by weight salts, and these are collectively referred to as milk minerals. In a preferred aspect, the solution or suspension incorporates milk minerals in such amounts that, after drying, the resulting skimmed milk powder substitute has substantially the same content of salt components as are found in skimmed milk powder.

It is possible that the salts may also include ions not usually found in milk such as $F^-$ and $I^-$. It is of course possible to alter the taste of the final food product by varying the amounts of salts present in the skimmed milk powder substitute.

The aqueous solution or dispersion comprising the components (a), (b) and (e) should be mixed for several minutes before drying, for instance 15–180 minutes, to ensure adequate mixing of the components so that the solution or dispersion is substantially homogeneous. Whilst the solution or dispersion may be subjected to homogenisation in a homogeniser at this stage, this is not essential.

The resulting solution or dispersion may then be evaporated in an evaporator in order to remove a significant part of its water content. Such evaporation may be carried out a: around 60° C. under vacuum. The resulting partially dried solution or suspension includes 100 weight parts of water to about 100–150 weight parts of the non-aqueous components such as the protein, sweetening/bulking agent, fat, salts etc.

The (optionally evaporated) solution or dispersion is then dried to form the skimmed milk powder substitute in which all of the components including the protein and the sweetening/bulking agent are intimately mixed together. The average particle size of the resulting powder is preferably 5–40 $\mu$m. This particle size helps to ensure that the final food product has the desired mouth feel, in particular that it does not give rise to a gritty sensation.

The solution or dispersion is dried using any conventional method for drying solutions such as spray drying, roller drying, freeze drying, attrition drying or fluidized bed drying. In the case of roller drying, this can be carried out with the roller set at a temperature of 30–300° C.

The most preferred drying technique is spray drying. This is because this technique is best suited to providing a powder formed from relatively uniformly sized particles. This uniformity results because the solution or suspension is forced under pressure through a spray drying nozzle to produce droplets which have a relatively uniform size. These droplets are dried in a column of rising warm air through which the droplets fall. The warm air column may have a temperature of about 100–250° C.

In a preferred aspect of the present invention, the powder composition is prepared by a so-called "in-line process" in which the non-fermentable sweetening/bulking agent is mixed in during the manufacture of an aqueous concentrate, solution or dispersion of milk protein and milk minerals obtained by isolating protein from milk or skimmed milk prior to drying. In more detail, whole milk is separated in a known way into cream and skimmed milk. The skimmed milk is then subjected to pasteurisation and then treated with acid and/or heat to precipitate the milk proteins. Without drying, these precipitates are converted to solutions using well known means and are then mixed with the non-fermentable sweetening/bulking agent in water to form a solution or dispersion. Alternatively the skimmed milk can be concentrated via well known membrane separation techniques such as ultrafiltration and diafiltration to yield a highly concentrated fluid milk protein concentrate to which the non-fermentable sweetening/bulking agent is added. Optionally products such as milk minerals may also be added at this stage according to subjective requirements such as taste. This aqueous solution or dispersion is then dried to form the skimmed milk powder substitute of the invention. It is mentioned that the basic techniques of precipitating proteins from milk and their subsequent treatment are described on pages 97–126, especially pages 119–125, of Developments in Dairy Chemistry-4 edited by P. F. Fox and published by Elsevier Applied Science.

Accordingly, in a preferred aspect of the present invention, the first mixing step is carried out by mixing the non-fermentable sweetening and/or bulking agent and the salts which are milk minerals with an aqueous solution, dispersion or concentrate of milk protein during the conventional procedure for isolating or manufacturing the protein from milk or skimmed milk.

The skimmed milk powder substitute provided by the present invention comprises 100 parts by weight of protein, 0–40 parts by weight of lactose, 0–10 parts by weight of fat, and 6–1600 parts by weight of a non-fermentable sweetening/ bulking agent, preferably 30–500 parts by weight of the sweetening/bulking agent, and most preferably 75–150 parts by weight of the sweetening/bulking agent. The resulting skimmed milk powder substitute closely mimics the properties of skimmed milk powder but has a much lower content of lactose.

The powder composition is useful as an ingredient of foods intended to have a reduced lactose content. Thus in a further aspect, the present invention provides a method for producing a food having a reduced lactose content and which is usually manufactured from ingredients including milk or a milk powder by partially or completely replacing the milk or milk powder by the above skimmed milk powder substitute or an aqueous solution or suspension thereof. The resulting food has a reduced content of lactose compared to the corresponding food produced using milk or milk powder. More generally, the skimmed milk powder substitute provided by the present invention is useful in the manufacture of food. Such foods include for instance confectionery products such as caramels, toffees, chocolate spreads, nougats, desserts, marshmallows, ice cream and chocolate.

In the skimmed milk powder substitute provided by the present invention, the physical environment of the protein is believed to be unique. The Inventors speculate that the protein exists within a matrix of fine crystals of the sweetening/bulking agent which causes the protein chains to be sheared during subsequent processing steps such as refining used in chocolate manufacture. Chocolate made using the skimmed milk powder substitute of the present invention has the same texture and mouth feel as chocolate made in the ordinary way from ingredients including milk powder.

The usual method of preparing chocolate is to mix melted cocoa liquor, sweetener, cocoa butter and milk powder together to form a paste. This paste is refined by passing through a roller refiner which breaks down the particle size of the composition optimally to about 12–25 $\mu$m. The refined composition is then conched which is a mixing process in which the introduction of air and application of heat and mechanical stress produce flavour changes and reduce the composition's moisture content. Whilst conching is capable of breaking down agglomerates, it does not result in any measurable reduction in particle size.

The conched material is then subjected to viscosity adjustment and further ingredients such as lecithin, cocoa butter, flavours and milk fat may also be added at this stage. The resulting composition is then tempered, molded, cooled and finally packaged as the chocolate product.

Accordingly, the present invention provides in a further aspect, a method for preparing a chocolate product comprising:

(i) mixing the skimmed milk powder substitute as previously described with cocoa liquor, cocoa butter and a sweetening/bulking agent, (ii) refining the mixture, (iii) conching the refined mixture, (iv) mixing the conched mixture with cocoa butter and lecithin, (v) tempering the mixture, and (vi) forming the tempered mixture into the chocolate product.

If the skimmed milk powder substitute used in the above step (i) does not include a component having a salt-like taste, then one or more of such components can be incorporated in the mixture. The amount of such components included in the mixture formed in step (i) is one of subjective taste, but in most cases the mixture should include around 0.5–2% by weight of salts and/or milk minerals. It is preferred that these minerals are the usual minerals found in milk. Aspartame may optionally be added during the above step (iv).

The resulting chocolate product comprises less than 1% by weight of total fermentable carbohydrates, preferably less than 0.5% by weight. It is found that by use of the skimmed milk powder substitute provided by the first, second or third aspects of the present invention, a chocolate product can be obtained having the desired effective maximum particle size (EMPs) for chocolate which lies in the range 10–40 $\mu$m, more preferably 12–25 $\mu$m. It is this EMPs, and the absence of significant numbers of large particles, which prevents the gritty mouth feel associated with chocolates formed from alternative milk powder substitutes formed principally from pure milk protein and/or which have not been subjected to the specific mixing and drying steps according to the present invention.

In the case where a powder composition is used to form chocolate which is produced by simply dry blending protein and the sweetening/bulking agent together, then it is found that the protein chains are not broken down during the refining and conching steps used to prepare chocolate. It is speculated that this may be because these proteins chains are relatively flexible so that they are able to resist forces exerted on them during these later processing steps without shearing. In contrast, the skimmed milk powder substitute of the present invention is found not to impart any gritty texture to chocolate in which it is included. Such chocolate is found to have a smooth mouth feel normally associated with good quality chocolate. It is speculated that the intimate mixing of the sweetening/bulking agent with the protein causes the former to facilitate shearing of the protein chains during the refining step which prevents the protein chains forming undesirable coarse particles in the chocolate.

It is preferred that the final food product should comprise 2–30% by weight of the milk powder substitute, more preferably 5–20% by weight and most preferably 8–15% by weight.

The skimmed milk powder substitute prepared by the present invention may be used not only as an ingredient in chocolate but also to produce any food product which is usually manufactured from food ingredients including milk, milk powder or skimmed milk powder. In such foods, the milk or powder is partially or completely replaced by the skimmed milk powder substitute provided by the present invention, or an aqueous solution or suspension thereof. The resulting food naturally has a reduced content of lactose compared to the corresponding food produced using conventional milk or milk powder. Such foods include confectionery such as toffees, caramels and ice-cream. The benefits of being able to prepare such foods in such a way that they comprise a reduced or negligible content of lactose are immediately apparent. Furthermore, the skimmed milk powder substitute provided by the present invention may also be used to prepare fat-reduced foods in view of its relatively low or nil fat content.

The foods provided by the present invention are preferably "tooth friendly" as defined by the pH Telemetry Test published by Tooth Friendly Sweets International, of Binningen in Switzerland. According to this test, a food is regarded as tooth friendly if the pH value of the tooth plaque does not fall below 5.7, 30 minutes after the food has been consumed.

The skimmed milk powder substitute of the present invention and foods which include it have a number of technical advantages over the milk powder substitute prepared according to EP-A-0 788 744 and foods which include it. Firstly, the present skimmed milk powder substitute is exceptionally fine and free flowing. Because of its negligible fat content, this free flowing property does not deteriorate upon storage so that the milk powder substitute of the present invention does not agglomerate or form clumps on storage. This facilitates the bulk handling of the present skimmed milk powder substitute and makes it easier to control its flow when used in bulk.

Due to its relatively low fat content, the present skimmed milk powder substitute does not tend to oxidise on storage and therefore has advantageous shelf life and flavour stability of up to 18 months or more. In contrast, long term storage of the milk powder substitute provided by EP-A-0 788 744 results in the oxidation of its fat component leading to rancid flavours. Accordingly, the shelf life of the milk powder substitute taught by this document is restricted compared to that of the skimmed milk powder substitute of the present invention.

The high fat content of the milk powder produced according to EP-A-0 788 744 inevitably leads to some fat melting during its transportation or storage at temperatures as low as 25° C. Such temperatures are however quite typical of those found in many countries, particularly during the summer months. There is also a significant risk that the fats in the fat-containing milk powders will be broken down into rancid tasting fatty acids due to the activity of lipase, an enzyme naturally present in milk but also released from some bacteria found in milk. In contrast, the milk powder substitute of the present invention has a relatively low fat content and so is not susceptible to these problems.

The skimmed milk powder substitute of the present invention may be used to produce fat-free products or fat-reduced products in view of its relatively low content of fat. In contrast, the milk powder produced according to EP-A-0 788 744 contains at least 33 weight parts of fat to 100 weight parts of protein, and in the majority of embodiments around equal weight amounts. Accordingly, this milk powder is not a skimmed milk powder substitute.

The process of producing the de-lactose milk powder of EP-A-0 788 744 is also economically disadvantageous compared to the process of the present invention. In particular, a relatively high content of fat is regarded as essential in EP-A-0 788 744 is compared to the relatively low level or absence of fat in the present skimmed milk powder substitute. Accordingly, the prior art suffers from the disadvantages firstly of the economic cost of having to provide the fat, and secondly that increased processing capacity is required in order to convert this fat content into the de-lactose milk powder. In contrast, there are clear economic advantages in the present invention which does not require any content of fat (thus saving its cost) and has a higher processing capacity because no or little time and capacity are needed to process the fat component into the final powder product. Furthermore, the use of an homogeniser is an essential feature of the process of EP-A-0 788 744 in order to form the stable oil-in-water emulsion of the protein and fat. In contrast, there is no need for such an homogenisation step when preparing the skimmed milk powder substitute of the present invention.

A further disadvantage of the fat component present in the de-lactose milk powder of EP-A-0 788 744 is that it lowers the softening temperature of chocolate in which the milk powder is incorporated. In contrast, chocolate prepared from the skimmed milk powder substitute of the present invention can avoid the presence of milk fats leading to a higher softening temperature which is advantageous.

A further advantage of the skimmed milk powder substitute of the present invention is that it can be prepared by in-line processing as described above in which only a single drying step is required. Additionally, the fat content of the milk which is extracted at an early stage of the in-line process is a by-product having significant economic value.

The present invention will now be further described by reference to the following Examples which are for the purposes of illustration only and should not be taken to restrict the scope of the appended claims.

EXAMPLE 1

Preparation of a Skimmed Milk Powder Substitute 36.1 parts by weight of soluble total milk protein (TMP) powder produced in the conventional way (see for instance pages 115–119 of Developments in Dairy Chemistry-4 mentioned above), 7.4 parts by weight of milk minerals, 2.5 parts by weight of sodium chloride and 54.0 parts by weight of lactitol were mixed with 185 parts by weight of water to form an aqueous suspension with vigorous stirring. The milk mineral mixture comprised 47% by weight of lactose, 10% by weight of protein, 36% by weight of minerals/salts, and the balance of moisture and fat. Stirring was continued for 10 minutes until the dispersion was substantially homogenous.

The dispersion was then spray dried using a conventional spray drying technique to prepare the skimmed milk powder substitute comprising 33.2% by weight protein, 52.4% by weight lactitol, 6.4% by weight minerals, 3.4% by weight lactose, 4.30% by weight moisture and 0.3% by weight fat. The fat to protein weighs ratio in this powder is about 0.009:1. The lactose content present in the powder results from its presence in the milk mineral mixture. This relatively modest content of 3.5% by weight of lactose should be contrasted with that of conventional skimmed milk powder which is generally around 50% by weight.

EXAMPLE 2

Preparation of a Skimmed Milk Powder Substitute by In-line Processing

A caseinate solution is produced from fresh acid casein curd obtained from skimmed milk in the known way (pages 119–125 of Developments in Dairy Chemistry-4) by washing and alkali conversion to form a caseinate solution having a total solids content of 25% by weight. This is then passed through a colloid mill, a mixer and then vigorously agitated in a dissolving vat either once or a plurality of times. The resulting mixture is then passed through a heat exchanger, a balancer tank following by addition of 20.5 weight parts of milk minerals, 7 parts by weight of sodium chloride and 150 parts by weight of lactitol and 532 parts by weight of water based upon the equivalent of 100 parts by weight of (dried) caseinate present.

The resulting solution or suspension is then subjected to spray drying to form the skimmed milk powder substitute comprising around 33.2% by weight of protein, 52.5% by weight of lactitol, 6.3% by weight of minerals, 4.3% by weight moisture, 3.4% by weight of lactose and 0.3% by weight of fat. The fat to protein weight ratio in this powder is around 0.009:1.

EXAMPLE 3

Preparation of a Skimmed Milk Powder Substitute by In-line Processing

A highly concentrated liquid milk protein retentate is produced from fresh skimmed milk using ultrafiltration and diafiltration membrane separation. This concentrate is then mixed with 15.3 weight parts of milk minerals, 7.7 parts by weight of sodium chloride and 158 parts by weight of lactitol based upon the equivalent 100 parts by weight of (dried) milk protein.

The resulting solution or suspension is then subjected to spray drying to form the skimmed milk powder substitute which comprises around 55.2% by weight of lactitol, 28.2% by weight of protein, 5.6% by weight of minerals, 4.4% by weight of lactose, 2.3% by weight of fat and 4.3% by weight of moisture. The fat to protein weight ratio in this powder is around 0.08:1.

EXAMPLE 4

Milk Chocolate

| Ingredient | wt. % |
| --- | --- |
| Cocoa liquor | 11.00% |
| Cocoa butter | 27.00% |
| Polydextrose (Type Litesse III ®) (produced by Cultor Food Science)) | 24.64% |
| Lactitol | 18.90% |
| Skimmed milk powder substitute of Example 1 or Example 2 | 13.50% |
| Milk Fat | 4.50% |
| Lecithin | 0.30% |
| Aspartame | 0.10% |
| Vanillin | 0.04% |
| Acesulpham-K | 0.02% |

The cocoa liquor, part of the cocoa butter, polydextrose, lactitol, the skimmed milk powder substitute formed in Example 1 or Example 2, vanillin and acesulpham-K were mixed and kneaded in the usual way to prepare milk chocolate. The mass obtained was refined by rolling until it reached the desired degree of fineness and, after adding more cocoa butter, the mixture was conched at a temperature of 58° C. for 12 hours. At the end of the conching process, the remaining cocoa butter, milk fat, lecithin and aspartame were added. The chocolate mass obtained in this way was tempered and moulded.

The chocolate product obtained was found to have a lactose content of about 0.5% by weight. The particles of chocolate had a particle size of 20 μm when measured with a micrometer.

EXAMPLE 5

Toffees

| | Ingredient | Amount by weight |
| --- | --- | --- |
| Part A | Skimmed milk powder substitute of Example 1 or Example 2 | 5.0 kg |
| | Water | 21.1 kg |
| | Polydextrose (Type Litesse III ®) | 33.8 kg |
| | Lactitol | 22.9 kg |
| | Sorbitol | 5.0 kg |
| | Cooking salt | 0.3 kg |
| | Glycerine monostearate | 0.4 kg |
| | Lecithin | 0.2 kg |
| | Pure butter fat | 11.0 kg |
| Part B | Aspartame | 0.1 kg |
| | Vanillin | 0.1 kg |
| | Flavouring agents | 0.1 kg |

The skimmed milk powder substitute formed in Example 1 or Example 2 was stirred into water until it dissolved and was allowed to stand for 2 hours. The polydextrose, lactitol and sorbitol were mixed dry and then stirred into the solution. The remaining constituents of Part A were then stirred into the solution and the solution heated to a temperature of 60° C. and maintained at this temperature for 20 minutes. Then the mass was heated to a temperature of 120° C. until it formed a plastic mass at which time the components of Part B were mixed in. The complete mass was then processed into sweets.

This formulation produced toffees containing 0.2% by wt. lactose and no sucrose.

EXAMPLE 6

Hard Caramels

| Ingredient | Amount by weight |
| --- | --- |
| Skimmed milk powder substitute of Example 1 or Example 2 | 7.50 kg |
| Pure butter fat | 5.20 kg |
| Isomalt | 84.00 kg |
| Polydextrose (Type Litesse III ®) | 7.00 kg |
| Lecithin | 0.20 kg |
| Cooking salt | 0.10 kg |
| Acesulpham K | 0.10 kg |
| Flavouring agents | 0.10 kg |
| Water | 28.00 kg |

The skimmed milk powder substitute formed in Example 1 or Example 2 was stirred into the water until it dissolved and allowed to stand for about 2 hours. Then all the other constituents with the exception of the flavouring agents were mixed into the solution and the resulting mixture heated to a temperature of 150° C. and evacuated. After normalizing the pressure, the flavouring agents were added whilst stirring. Then the mass was poured out, cooled and processed into sweets.

This formulation produced hard caramels containing 0.25% by weight lactose and no sucrose.

EXAMPLE 7

Non-fat Sugarless Ice Cream

| Ingredient | Weight % |
| --- | --- |
| Skimmed milk powder substitute produced in Example 1 or Example 2 | 18.50% |
| Polydextrose (Litesse III ®) | 8.10% |
| Lactitol | 6.70% |
| Maltitol Syrup, 75% solids | 4.40% |
| Cremodan SE30 | 0.50% |
| Vanilla Flavour | 0.60% |
| Aspartame | 0.04% |
| Water | balance |

The skimmed milk powder substitute of Example 1 or Example 2 was stirred into water until it dissolved and was then allowed to stand for about 2 hours. Then all of the other constituents were added to the solution and the resulting mixture was pre-heated to a temperature of 65° C. Pasteurization was achieved through a high temperature short time process of 82–88° C. for 25 seconds, followed by two-stage homogenization at pressures of $1.4 \times 10^7$–$1.7 \times 10^7$ Pa and $3.3 \times 10^6$ Pa on the first and second stages respectively and cooling to 4° C. After ageing at 4° C. for 12 hours, the pasteurized mixtures were flavoured and frozen in a continuous ice cream freezer to an overrun between 50 and 100%, filled into containers at a draw temperature between −3 and −5° C., and hardened overnight at −6° C. in a blast freezer.

The resulting ice cream has a fermentable sugar content of less than 1% by weight in the final product.

What is claimed is:

1. A method for preparing a skimmed milk powder substitute comprising the steps of:
   (i) mixing:
      (a) protein selected from total milk protein, milk protein concentrate and milk protein isolate, (b) a non-fermentable sweetening and/or bulking agent, and (e) one or more salts in water to form an aqueous solution or dispersion which includes 0–40 weight parts of lactose and 0–10 weight parts of fat per 100 weight parts of the protein; and
   (ii) drying the solution or dispersion to form the powder substitute in which the protein and sweetening and/or bulking agent are intimately mixed.

2. A method according to claim 1, wherein the non-fermentable sweetening agent is lactitol.

3. A method according to claim 1 or claim 2, wherein the aqueous solution or dispersion comprises 1 part by weight of protein and 0.06–16 parts by weight of the sweetening and/or bulking agent.

4. A method according to claim 1 wherein the drying step (ii) comprises spray drawing the aqueous solution or dispersion.

5. A method according to claim 1 wherein the mixing step (i) comprises mixing the non-fermentable sweetening and/or bulking agent and the one or more salts with the aqueous solution or dispersion during the isolation or manufacture of protein from skimmed milk.

6. A method according to claim 1 wherein the aqueous solution or dispersion further comprises cocoa liquor.

7. A skimmed milk powder substitute comprising an intimate mixture of:
   (a) total milk protein, milk protein concentrate or milk protein isolate,
   (b) a non-fermentable sweetening and/or bulking agent,
   (c) 0–40 parts by weight of lactose per 100 parts by weight of the protein,
   (d) 0–10 parts by weight of fat per 100 parts by weight of the protein, and
   (e) one or more salts.

8. A skimmed milk powder substitute according to claim 7, which comprises 1 part by weight of protein and 0.06–16 parts by weight of the sweetening and/or bulking agent.

9. A skimmed milk powder substitute according to claim 7 or claim 8, which further comprises cocoa liquor.

10. A method for preparing a chocolate product comprising:
    (i) mixing the skimmed milk powder substitute of any of claims 7–9 with cocoa liquor, cocoa butter and a sweetening and/or bulking agent,
    (ii) refining the mixture,
    (iii) conching the refined mixture,
    (iv) mixing the conched mixture with cocoa butter and lecithin,
    (v) tempering the mixture, and
    (vi) forming the tempered mixture into the chocolate product.

11. A chocolate product obtainable by the method of claim 10, and comprising less than 1% by wt. of total fermentable carbohydrates.

12. A method of making a food which requires milk comprising combining a food product with said skimmed milk powder substitute of claim 7.

13. A method in accordance with claim 12 wherein said food product is selected from the group consisting of a caramel, a toffee, a chocolate spread, a nougat, a dessert, a marshmallow, an ice cream and a milk chocolate.

* * * * *